Dec. 20, 1960 R. F. HIGH 2,965,307
EXTENSIBLE SPRAYING APPARATUS
Filed April 10, 1957 3 Sheets-Sheet 1
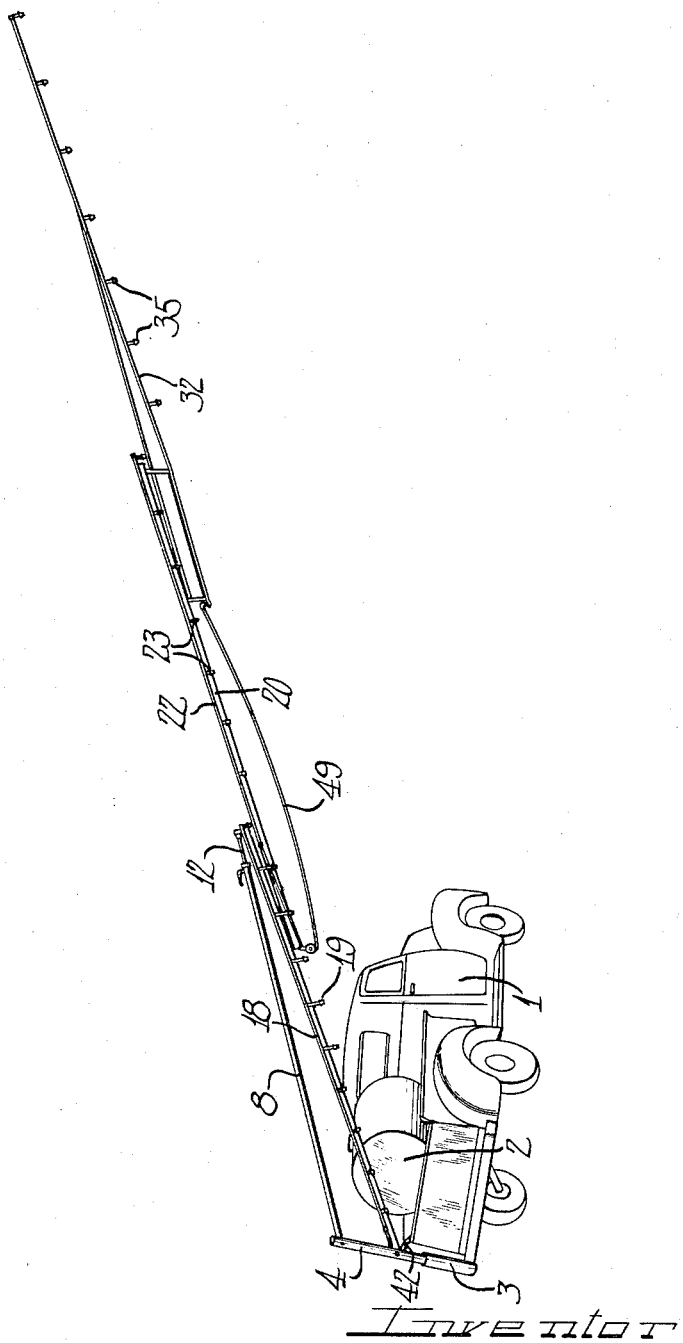
Inventor
Ray F. High

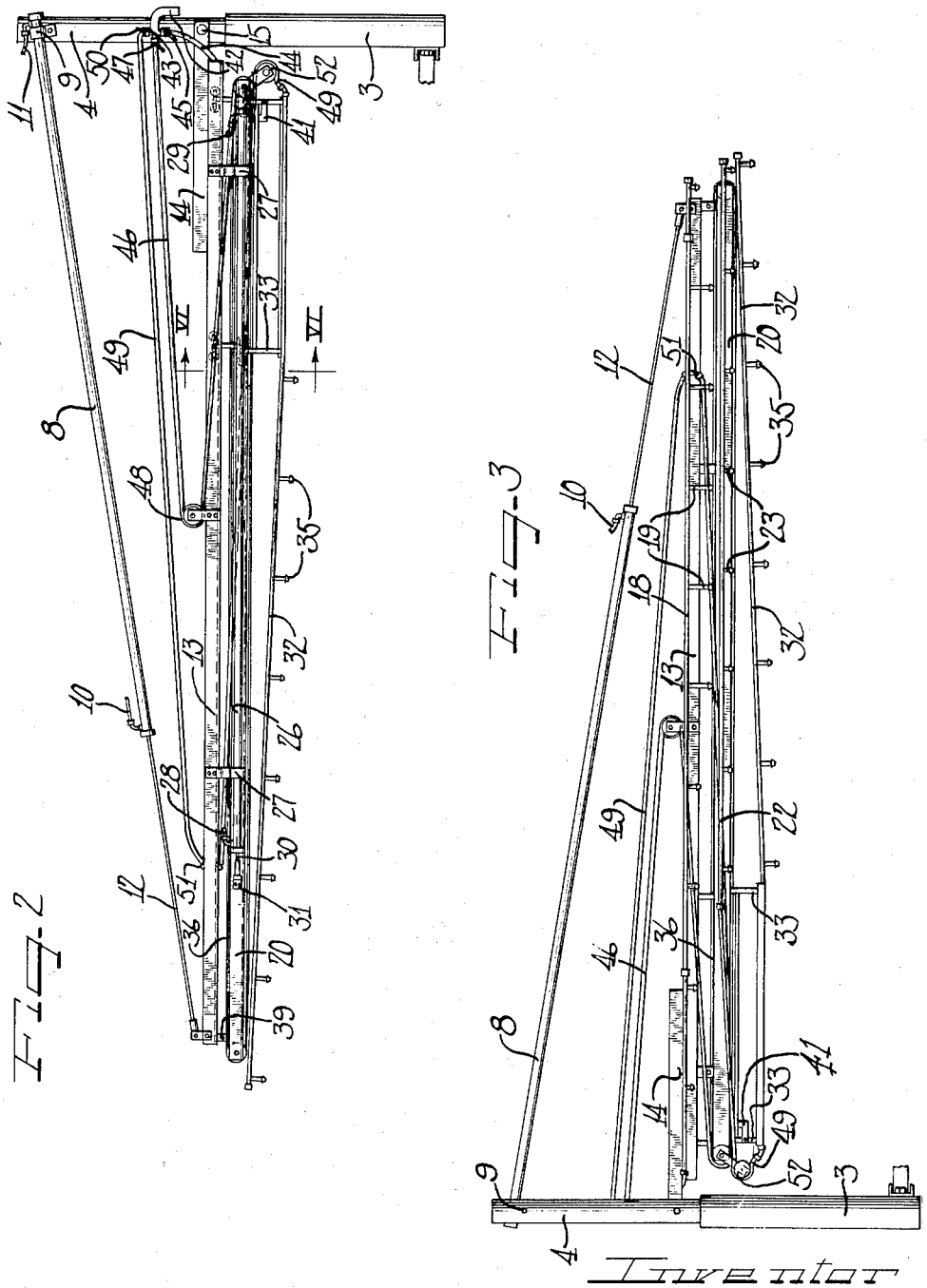

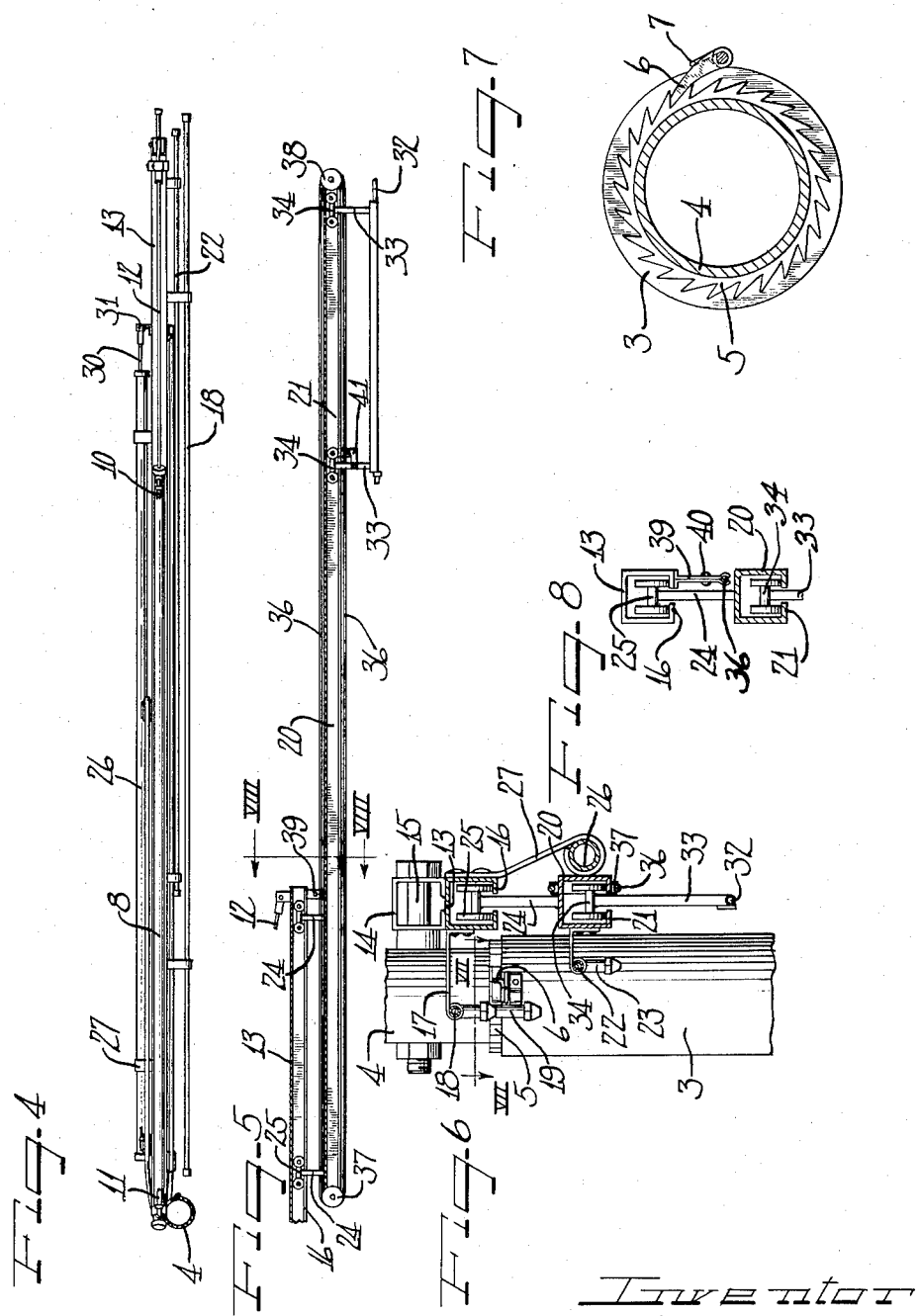

United States Patent Office 2,965,307
Patented Dec. 20, 1960

2,965,307
EXTENSIBLE SPRAYING APPARATUS
Ray F. High, Mount Auburn, Ill.

Filed Apr. 10, 1957, Ser. No. 652,024

6 Claims. (Cl. 239—273)

This invention relates to improvements in extensible spraying apparatus, and more particularly to spraying apparatus of the spray boom type wherein the spraying mechanism per se is extensible and contractible so as to be adjustable in accordance with the widths of the area to be sprayed, the invention being highly desirable for the spraying of insecticides, fungicides, weed control chemicals, liquid fertilizers, disinfectants, and other spray solutions, although the invention will have other uses and purposes as will be apparent to one skilled in the art.

In the past, many and various types of apparatus embodying a spray boom have been developed, but in every instance of which I am aware these formerly known devices could not be adjusted when and as desired, and particularly during operation, to vary the width of the sprayed area on one side of the transporting vehicle. In most cases, formerly known spray boom devices have been mounted so that a spray boom projected on each side of a vehicle, and while the respective booms could be elevated and lowered in order to pass through gateways and the like, the length of spraying mechanism could not be varied on one side of the vehicle. This was particularly objectionable in connection with the spraying of highway shoulders, where the widths of the shoulder may vary to a considerable extent within a relatively short distance and wherein numerous obstructions such as trees, bushes, road signs, fences, and the like, must be avoided while the spraying operation continues along the highway. Consequently, with spraying apparatus as heretofore manufactured, frequent stopping, starting, and reversing of the vehicle were essential in order to effectively cover the desired area without injury to various obstacles in that area, and even then where the area widened materially it was impossible to cover the full width of the area, and where the area varied in widths abruptly, it was virtually impossible to effect a continuous forward movement of the vehicle even though the spraying apparatus would accommodate variations in the area.

With the foregoing in mind, it is an important object of the instant invention to provide extensible spraying apparatus readily mountable on an automotive truck or other suitable vehicle which carries the tank of spraying solution thereon and provides the necessary power, and which comprises extensible spray boom means which is variable in length at will and during operation.

Another object of the instant invention is the provision of extensible spraying apparatus embodying extensible and contractible spray boom means all of which may project from one side of a vehicle and be varied in length whenever desired.

Another feature of the instant invention resides in the provision of extensible spraying apparatus readily mountable upon a vehicle capable of traveling on highways, and which spraying apparatus embodies extensible spray boom means not only variable in length at will, but also variable in elevation at will, so that the vehicle may spray the shoulder of a highway and compensate for variations in widths of shoulder as well as avoid obstacles on the shoulder, all while the vehicle continues in forward motion.

Still a further feature of the instant invention resides in the provision of boom spraying apparatus wherein the spray boom means are extensible or contractible as well as variable in elevation, all while the spraying operation continues.

A further object of the instant invention resides in the provision of extensible and contractible boom spraying apparatus which may be readily mountable upon a transporting vehicle and which structure is adjustable to a position parallel with the vehicle for transportation purposes, and to a position at an angle to the vehicle for spraying purposes.

Also an object of the instant invention is the provision of extensible and contractible spraying apparatus embodying a plurality of spray boom sections or assemblies and wherein all but the base section or assembly are movable longitudinally relatively to the base section and relatively to each other.

It is also an object of this invention to provide extensible and contractible boom spraying apparatus embodying spray boom assemblies movable relatively to each other, with hydraulic means actuating the movement of the boom assemblies.

Still a further feature of the instant invention resides in the provision of extensible and contractible boom spraying apparatus embodying separate spray boom assemblies of which all but the base assembly are movable relatively to the base assembly and relatively to each other, and in which the base assembly is also variable in elevation at will to thereby conjointly raise or lower all of the assemblies when desired.

It is a still further feature of the instant invention to provide an extensible and contractible spraying apparatus of the character set forth in the preceding paragraph in which separate hydraulic means are utilized to extend and contract the boom assemblies, and to elevate and lower the assemblies.

While some of the more salient features, characteristics and advantages of the instant invention have been above pointed out, others will become apparent from the following disclosures, taken in conjunction with the accompanying drawings, in which—

Figure 1 is a fragmentary projectional view illustrating spraying apparatus embodying principles of the instant invention mounted in operative position upon a transport vehicle, with the spray boom means fully extended and also shown in an elevated position;

Figure 2 is a fragmentary side elevational view of the spraying apparatus itself, enlarged from the showing in Fig. 1, and taken from the opposite side of the showing in Fig. 1, and showing the spraying apparatus in contracted position;

Figure 3 is a view similar in character to Fig. 2, but taken from the opposite side;

Figure 4 is a top plan view of the spraying apparatus as seen in Fig. 3, with the supporting post shown in section;

Figure 5 is a fragmentary view of the spraying apparatus showing the base and intermediate assemblies in vertical section to better illustrate a part of the means by which the separate assemblies are movable relatively to each other;

Figure 6 is a greatly enlarged fragmentary transverse sectional view taken substantially as indicated by the line VI—VI of Fig. 2, looking in the direction of the arrows;

Figure 7 is a greatly enlarged vertical sectional view through the supporting post structure taken substantially as indicated by the line VII—VII of Fig. 6; and Figure 8 is an enlarged central vertical sectional view, with parts omitted, illustrating the clamping connections of the spray booms with an actuating member.

As shown on the drawings:

The illustrated embodiment of the instant invention is shown rather diagrammatically in the drawings, because many parts going into the overall structure are of standard and well known character, and therefore need not be detailed in the drawings.

Further, it will be understood that the instant invention may be used for a great number of various spraying operations, including both plant and animal spraying, but for purposes of clarity the invention will be herein disclosed and described in the form of spraying equipment highly desirable for use in the spraying of highway shoulders.

With reference now to Fig. 1, I have illustrated a transporting vehicle 1 which may be in the nature of a truck or tractor, and which carries thereon a pressure tank 2 for spray liquid of any desired composition. Preferably adjacent the left rear corner of the body, the vehicle 1 carries a fixed mounting socket 3 for the spraying means per se. This particular location aids in maintaining a balance of the equipment, especially when the spray boom apparatus is fully extended, as shown in Fig. 1, where the truck body provides a stable base for the spray booms. In Fig. 1, the extensible spray boom apparatus is shown fully extended, and partially elevated.

The spraying apparatus itself includes a supporting post 4 which is rotatably seated in the vehicle socket 3. With reference to Figs. 6 and 7, it will be seen that the angular relationship of the spraying apparatus to the vehicle may be controlled and maintained by way of a ratchet wheel 5 carried by the supporting post 4 and rotatable therewith. A dog or pawl 6, spring urged as indicated at 7, is pivoted on the vehicle socket 3 to engage the ratchet wheel 5 and thus hold the supporting post 4 in a desired degree of rotation.

With reference more particularly to Figs. 2 and 3 it will be seen that a hydraulic ram 8 is connected to the supporting post 4 at one end of the ram as indicated at 9. Fluid lines 10 and 11 are associated with opposite ends of the hydraulic ram, and may be connected to any suitable source of fluid pressure, such as a pump carried by the vehicle 1. Connected to the piston of the ram is a tension element 12, the free end of which is also anchored to the outboard end of a spray boom support 13, the inboard end of which is welded or equivalently connected to a supporting arm 14 pivoted as at 15 to the post 4 at a lower level than the ram 8. With reference now to Fig. 6, it will be seen that the supporting arm 14 is preferably of substantially closed channel shape for strength purposes, and the boom support 13 is of similar shape, forming a three sided channel with partially inturned bottom flanges 16 to provide an inside track.

Secured by any suitable form of brackets 17 connected to the side of the support 13 is a hollow spray boom 18 in the form of a pipe from which a plurality of nozzles 19 depend. Except for its up and down pivotal movement about the pivot 15, the assembly including the support 13 and spray boom 18 is not movable relatively to the supporting post 4. This structure forms the base boom assembly or section. Obviously, when the hydraulic ram 8 is operated by pressure through the line 10, the tension element 12 will be drawn into the body of the ram and elevate the base spray boom assembly, and conversely if the ram is actuated in the opposite direction the base boom assembly will be lowered.

The intermediate or second boom assembly also includes a support 20 of the same shape as the support 13, with inwardly turned spaced bottom flanges 21 also forming an inside track. Carried by this support 20 is a spray boom 22 in the form of a pipe, from which a plurality of spaced nozzles 23 depend.

The boom support 20 is carried by a pair of spaced hangers 24 as seen in Figs. 5, 6 and 7, each of which hangers is connected at its top end to a wheel carriage 25 riding the track flanges 16—16 inside the aforesaid boom support 13. As noted in Fig. 5, the hangers are preferably disposed adjacent the inboard end of the support 20, but spaced sufficiently far apart to securely support the boom cantilever style when the boom support is extended. Of course, the intermediate boom assembly is movable longitudinally relatively to the base boom assembly by virtue of the hangers 24 and the wheel carriages 25.

In order to actuate the intermediate or second boom assembly, another hydraulic ram 26 is suspended from the base boom support 13 by suitable hangers 27 as seen best in Figs. 2 and 6. This hydraulic ram 26 is provided with feed lines 28 and 29 at opposite ends thereof which may be connected to the fluid pressure source carried by the vehicle 1. The piston of this ram is provided with a plunger 30 connected to a bracket 31 attached to the boom support 20, as best seen in Figs. 2 and 4. Thus, when the ram is energized through the feed line 29, the intermediate boom assembly is forced outwardly from the position seen in Figs. 2, 3 and 4 to the extended position seen in Figs. 1 and 5, or to any intermediate position of extension.

An outer or third boom assembly, comprising a spray boom 32 is carried by a plurality of hangers 33 depending from wheel carriages 34 ridable inside the boom support 20 on the track flanges 21 thereof as seen in Figs. 5 and 6. Nozzles 35 depend from the spray boom 32.

The outer spray boom 32 is caused to move longitudinally relatively to the intermediate spray boom assembly by means of an endless cable 36 which is trained around laterally offset pulleys 37 and 38 at opposite ends of the boom support 20. As seen in Figs. 5 and 8 a clamp 39 is fixed to the outer end of the base boom support 13, and firmly clamped to the cable 36 in a region corresponding to maximum extension of the intermediate boom assembly. As seen in Fig. 8, this clamp may be a split element having furcations at least partially embracing the cable 36, and these furcations may be tightened onto the cable by means of a bolt 40 or in any other suitable manner. In any event, the connection of the clamps 39 is a fixed connection preventing relative movement of the cable lengthwise in respect to the stationary base support 13. A similar clamping arrangement 41, Fig. 5, connects one of the hangers 33 of the spray boom 32 to the cable, and this clamp is fixedly engaged with the cable at a point coresponding to maximum extension of the spray boom 32. Consequently, as the boom support 20 is moved outwardly from retracted position of Figs. 2 and 3, to the extended position of Fig. 5, the cable 36 lengthens on the outer side of the clamp 39 and accordingly shortens on the inner side of the clamp 39, thereby causing movement outwardly of the spray boom 32 by virtue of the clamp 41. With this arrangement, when the intermediate boom assembly reaches fully extended position, the outer spray boom 32 also reaches extended position. Upon retraction of the intermediate boom assembly, the outer spray boom 32 must also retract accordingly so that all sections of the apparatus arrive at retracted position substantially simultaneously.

With reference now more particularly to Figs. 2 and 3 it will be seen that the various spray booms may be fed from the tank 2 on the vehicle by a main pipeline 42 which extends from the tank to a coupling 43 mounted on the supporting post 4. From the coupling 43 a flexible pipeline 44 connects with the base spray boom 18, and this pipeline is provided with an individual valve diagrammatically indicated at 45. Another flexible pipeline 46 provided with its individual valve 47 passes over a pulley 48 carried on the main boom support 13 and connects with the rear end of the intermediate spray boom 22, this pipeline 46 being of sufficient length to permit extension and retraction of the intermediate spray boom.

A third pipeline 49 equipped with a valve 50 passes through a slip shoe 51 on the base boom support 13 and returns to pass around a pulley 52 depending at an angle from the rear end of the intermediate boom support 20, and thence connects with the outer spray boom 32. In the above manner, each of the spray booms is separately supplied by a liquid line from the coupling 43 and each line is separately valved so as to provide selectivity in spraying.

In operation, the instant invention is extremely simple and yet highly efficient and effective. For highway transporting, with the spraying apparatus idle, it is a simple expedient by manipulation of the pawl 6 to rotate the supporting post 4 and bring the entire spraying apparatus in contracted position substantially parallel with the left side of the vehicle. This would result in a rotation of substantially 270° clockwise from the position seen in Fig. 1. The spraying apparatus then may very easily be transported from place to place because it would occupy a minimum of room along the side of the vehicle.

When it is desired to spray a highway shoulder, for example, it is a simple expedient to revolve the spraying apparatus to the position seen in Fig. 1, and then by actuation of the hydraulic ram 8 the desired elevation may be obtained, and by actuation of the hydraulic ram 22 desired extension of the spray booms may be obtained. Extension and contraction of the spray booms, as well as elevation, may be had at any desired time and while the spraying operation continues.

Assuming that the vehicle is moving along a highway shoulder, with the spraying booms fully or partially extended and substantially parallel with the ground, it is a simple expedient by manipulating the hydraulic ram 8 to elevate the spray boom apparatus to pass obstructions such as bushes, fences, road signs, and the like. The elevation and lowering of the boom may go on while the spraying operation continues, and while the vehicle continues its forward motion down the highway. Likewise, if the highway shoulder varies in width, it is a simple expedient to extend or contract the spray boom assemblies in keeping with the shoulder width, and this may be done rapidly by the actuation of the hydraulic ram 22, while the spraying operation continues and while the vehicle continues its forward motion. Substantially any desired elevation for spraying purposes may be had in the event it is desirable to spray trees and the like, and substantially any desired degree of extension up to the maximum limit may be had at any time. The individual valves controlling the feed lines to the spray booms may be selectively operated so any or all of the spray booms may operate at one time.

From the foregoing, it is apparent that I have provided novel extensible spray boom apparatus which gives a high selectivity of range and height, variable when desired to meeet the exigencies and circumstances, and without stopping operation. Further, the structure is economical to make and use and is highly durable.

It will be understood that modifications and variations may be effected without departing from the scope of the novel concepts of the present invention.

I claim as my invention:

1. A spraying apparatus comprising a support structure, an extensible arm mounted for vertically pivotal movement and horizontally rotational movement on said support structure, means for extending said arm, a spray boom connected to said support structure at one end and to the outer end of said extensible arm at the other end for vertically pivotal movement in response to expansion and contraction of said arm, a second spray boom movably and axially connected to said first spray boom, means for moving said second spray boom relative to said first spray boom, a third spray boom movably and axially mounted on said second spray boom, and means interconnecting said first, second and third spray booms to effect movement of the third spray boom in response to relative movement of the first and second spray booms.

2. A spraying apparatus comprising a support structure, an extensible arm mounted for vertically pivotal movement and horizontally rotational movement on said support structure, means for extending said arm, a spray boom connected to said support structure at one end and to the outer end of said extensible arm at the other end for vertically pivotal movement in response to expansion and contraction of said arm, a second spray boom movably and axially connected to said first spray boom, means for moving said second spray boom relative to said first spray boom, a third spray boom movably and axially mounted on said second spray boom, and means interconnecting said first, second and third spray booms to effect movement of the third spray boom in response to relative movement of the first and second spray booms, said support structure including a vertical, rotatable post and ratchet means for selectively locking the post in a desired angular position, said extensible arm and first spray boom being pivotally connected to said vertical post in vertically spaced relationship.

3. A spraying apparatus comprising a support structure, an extensible arm mounted for vertically pivotal movement and horizontally rotational movement on said support structure, means for extending said arm, a spray boom connected to said support structure at one end and to the outer end of said extensible arm at the other end for vertically pivotal movement in response to expansion and contraction of said arm, a second spray boom movably and axially connected to said first spray boom, hydraulic means for moving said second spray boom relative to said first spray boom, a third spray boom movably and axially mounted on said second spray boom, and means interconnecting said first, second and third spray booms to effect movement of the third spray boom in response to relative movement of the first and second spray booms.

4. In an extensible spraying apparatus, a support post, an arm having telescoping sections and pivotally secured at one end to said post, hydraulic means for extending said arm, a spray boom having one end connected to the other end of said arm and the other end connected to said post below said arm, a second spray boom carried by said first spray boom in axially movable relationship thereto, hydraulic means carried by said first spray boom for moving the second spray boom axially thereof, a third spray boom axially and movably carried by said second spray boom, a cable, pulley means on said second spray boom supporting said cable in the manner of an endless belt, means fastening said cable to said first spray boom and means connecting said cable to said third spray boom, said connecting and said fastening means being spaced along said cable to effect movement of said third spray boom relative to said second spray boom in response to relative movement of said first spray boom and said second spray boom.

5. An extensible boom type spraying apparatus including supporting means, a first spray boom support, means connecting said first spray boom support to said supporting means in a desired position thereof, a first spray boom carried by said first spray boom support, a second spray boom support carried by and movable relatively to said first spray boom support, a second spray boom on said second spray boom support, means on said first spray boom support for moving said second spray boom support and said second spray boom relative to said first spray boom support and said first spray boom, a third spray boom carried by and movable relative to said second spray boom support, and means interconnecting said first spray boom support and said third spray boom including pulley means on said second spray boom support for effecting movement of said third spray boom in response to movement of said second spray boom and second spray boom support relative to said first spray boom and first spray boom support.

6. In extensible spraying apparatus, supporting means, first spray boom means pivoted to one end of said supporting means, telescoping means pivotally connected to said supporting means and to an outer end portion of said first spray boom means including means to extend or retract said telescoping means to swing said first spray boom means through a vertical arc, means mounting said supporting means to permit movement of said supporting means through a horizontal arc, second spray boom means carried by said first spray boom means and movable longitudinally relative to said first spray boom means, third spray boom means carried by said second spray boom means and movable longitudinally relative to said second spray boom means, means carried by said first spray boom means for moving said second spray boom means axially thereof, a plurality of nozzle elements spaced along each of said spray boom means, a separate supply line for each of said spray boom means and the nozzles thereof, and means interconnecting said first, second and third spray boom means to move said third spray boom means relative to said first and second spray boom means in response to movement of said second spray boom means relative to said first spray boom means.

References Cited in the file of this patent
UNITED STATES PATENTS

| | | |
|---|---|---|
| 954,241 | Affelder et al. | Apr. 5, 1910 |
| 999,076 | Willis | July 25, 1911 |
| 1,776,100 | Blatt | Sept. 16, 1930 |
| 1,835,132 | Anania | Dec. 8, 1931 |
| 2,064,278 | Tappe | Dec. 15, 1936 |
| 2,532,996 | Clark | Dec. 5, 1950 |
| 2,725,256 | Devost et al. | Nov. 29, 1955 |

FOREIGN PATENTS

| | | |
|---|---|---|
| 144,264 | Sweden | Feb. 23, 1954 |